F. A. LITTLEFIELD.
STEAM TRAP.
APPLICATION FILED DEC. 2, 1909.
994,851.
Patented June 13, 1911.
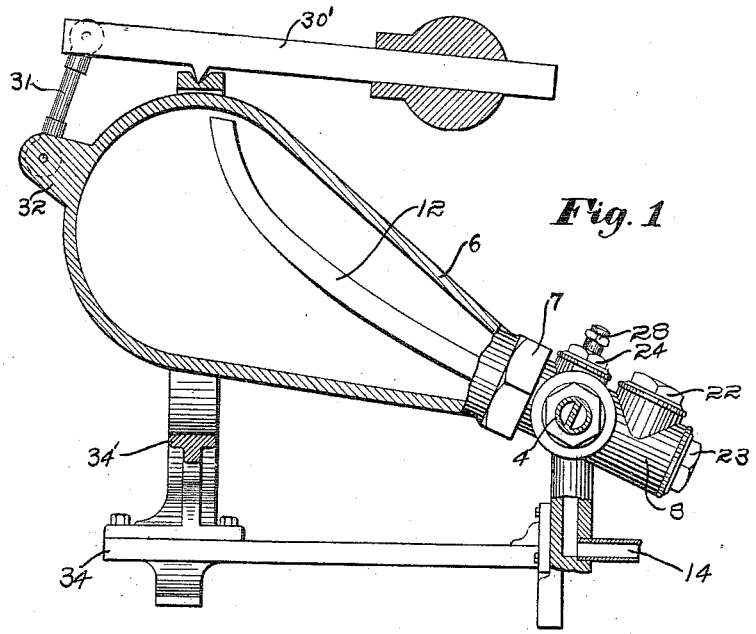
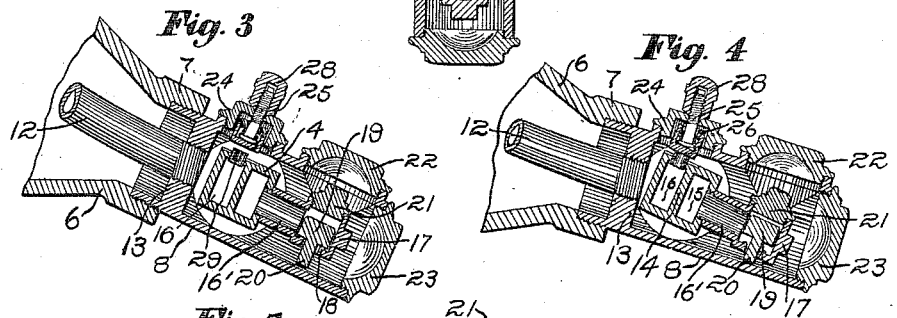
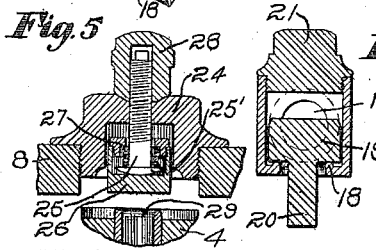
Witnesses:
Carl L. Choate.
Horace A. Crossman.
Inventor:
Frank A. Littlefield,
by Emery & Booth
Attys.

UNITED STATES PATENT OFFICE.

FRANK A. LITTLEFIELD, OF NASHUA, NEW HAMPSHIRE, ASSIGNOR TO NASHUA MACHINE COMPANY, OF NASHUA, NEW HAMPSHIRE, A CORPORATION OF MAINE.

STEAM-TRAP.

994,851.

Specification of Letters Patent. Patented June 13, 1911.

Application filed December 2, 1909. Serial No. 531,034.

*To all whom it may concern:*

Be it known that I, FRANK A. LITTLEFIELD, a citizen of the United States, and a resident of Nashua, in the county of Hillsboro and State of New Hampshire, have invented an Improvement in Steam-Traps, of which the following description, in connection with the accompanying drawings, is a specification, like letters on the drawings representing like parts.

This invention pertains to steam traps and may be embodied in that general type of trap shown and described in my United States Letters Patent No. 893,529, dated July 14, 1908, and in my pending application Serial No. 476,069, February 4, 1909.

In order that the principle of the invention may be readily understood, I have disclosed a single embodiment thereof in the accompanying drawings, wherein—

Figure 1 is a view mainly in vertical central section of a steam trap embodying my invention; Fig. 2 is a horizontal section taken through the bowl head, its trunnions and adjacent parts; Fig. 3 is a central vertical section taken through the bowl head and representing the position of the valves when the bowl is elevated; Fig. 4 is a corresponding view representing the position of the valves when the bowl is depressed; Fig. 5 is a sectional detail view on an enlarged scale of the vent valve; Fig. 6 is a similar view of the live steam valve.

While the steam trap herein disclosed may in certain aspects thereof be of general application, it is more particularly intended for use as a return trap for steam boilers, so far as the construction shown in Figs. 1 to 6 is concerned.

Referring more particularly to the drawings, the base or tripod whereon the various parts of the trap are supported is indicated at 1, it preferably having a tubular yoke generally similar to that shown in my Patent No. 491,486, Feb. 8, 1893, the ends of the yoke arms being represented at 2, 3 in Fig. 2. The said yoke arms 2 and 3 respectively support the trunnions 4, 5, serving in the character of stud shafts whereon the tilting bowl 6 is mounted. Into the neck 7 of the bowl is threaded the chambered head 8 as shown in Figs. 2, 3 and 4, said head having opposite packing nuts 9, 10 threaded into side openings therein. Said nuts 9 and 10 constitute bearings for the bowl and permit it and its chambered head to rock upon the trunnions 4 and 5.

The trunnion 5, and which I herein for convenience designate the feed and discharge trunnion, may be and preferably is similar to the corresponding part in my said application No. 476,069, it being preferably provided with a coil spring 11 tending to move said trunnion axially to the right viewing Fig. 2, thereby to establish a tight joint between said trunnion and the packing nut 10. The pipe constituting the trunnion 5 is suitably connected to the steam boiler and to the circulation, in order to receive the water of condensation and conduct it into the bowl through the head 8 of the bowl, as indicated by the arrow in Fig. 2. When the bowl is filled, the water of condensation is returned through said pipe to the boiler.

In that type of steam trap to which my invention is more particularly directed, the water of condensation flows by gravity from the bowl when the same is depressed. In order to permit the water of condensation to escape from the bowl by gravity, I introduce steam or other suitable fluid into the bowl above the surface of the water therein, so that the pressure upon the water may be equalized. For this purpose, the bowl is provided with a pipe 12 threaded into a partition 13 near one end of the head 8. Steam or other suitable fluid is admitted from any suitable source into the pipe 14 shown in Fig. 1 as tapped into the yoke, and is then conducted through the hollow yoke arm 2 and thence into the trunnion 4.

I have for convenience herein designated the trunnion 4 as a live steam and vent trunnion. As shown most clearly in Fig. 2, this trunnion has its inner end which is positioned within the head 8 closed, and is divided by a longitudinal partition 14 into a live steam inlet passage 15 and a steam exhaust passage 16. The steam inlet passage 15 is at all times in communication with the interior of the yoke arm 2, as shown in Fig. 2, and thus is constantly supplied with steam.

As shown most clearly in Figs. 3 and 4, the trunnion 4 is provided with a threaded lateral opening at that end which is received within the head 8, and threaded thereinto is a short pipe 16' positioned wholly within the outer end of the head 8 of the bowl and having a closed end 17. Preferably in the bottom of the pipe 16' I provide a valve seat 18 and mount thereon a live steam valve 19 having a stem 20 extending through the valve seat 18 to within a suitable distance from the adjacent portion of the interior wall of the head 8, when the bowl 6 is elevated or in its filling position. The valve stem 20 should for the best results be of such length as to provide for lost motion between the movements of the bowl and valve, as will be more particularly described. Opposite the valve seat 18 the pipe 16' is preferably provided with a threaded plug 21 and in line therewith the head 8 is provided with a suitably threaded plug 22 permitting access to the parts. Preferably also the head 8 is provided with an end threaded plug 23.

While the bowl 6 is filling—that is, while it is in elevated position,—the live steam valve 19 is seated, inasmuch as its stem 20 is out of contact with the wall of the head 8. When, however, the bowl is filled and descends in the frame, the head 8 thereof, being at the opposite side of the trunnions from said bowl, is elevated into the position shown in Fig. 4. During the movement of the head 8 into the position shown in Fig. 4, the wall thereof contacts with the stem 20 of the live steam valve 19, thereby lifting the valve as indicated in said figure and opening the same. This permits the steam contained within the inlet passage 15 and pipe 16' to escape past said valve into the annular space between the pipe 16' and head 8, and thence through the pipe 12 into the bowl 6, thereby equalizing the pressure upon the water of condensation in the bowl.

Preferably the stem 20 of the valve 19 is made short enough so that the bowl may have moved downward a sufficient distance to acquire considerable momentum before the wall of the bowl head 8 contacts with said stem and opens the valve. The result of this construction is that when the valve is opened, it is opened quickly and the descent of the bowl is not interrupted.

It is apparent that after the bowl has emptied it is necessary to reduce the steam pressure therein to permit refilling thereof. For this purpose, I have in this embodiment of the invention provided a vent valve shown most clearly in Figs. 3, 4 and 5. As there shown the head 8 has a plug 24 threaded therein and tapped into said plug is an adjustable valve stem 25 having a flange 25' provided with a preferably rounded lower face, and a valve head 26 loosely mounted on said stem. Said valve head is preferably composed of two parts threaded together and between said valve head and the valve stem flange 25' is a coiled spring 27. The valve stem 25 is provided with a lock nut 28 permitting any desired adjustment of said valve stem. The valve head 26 is adapted to seat upon a preferably detachable valve seat 29 provided upon the steam exhaust side of the trunnion 4. It will be noted that the vent valve is at the opposite side of the rocking axis of the bowl 6 from the live steam valve 19.

Viewing Fig. 3, it will be noted that when the bowl 6 is in elevated or filling position, the vent valve is opened, thereby permitting reduction of steam pressure within the bowl 6. The steam introduced into said bowl to equalize the pressure upon the water therein escapes through the pipe 12 and enters the steam exhaust passage 16 through the valve seat 29 and thence escapes through any suitable pipe 30 to any desired point. The pipe 30, if employed, may, as shown in Fig. 2, be tapped into both the yoke arm 2 and the end of the trunnion 4. It will be apparent that in this embodiment of my invention the live steam valve 19 closes during and preferably at the commencement of the upward movement of the bowl 6 and when closed prevents admission of steam through the pipe 12 into the bowl. The vent valve does not begin to open until the live steam valve is entirely closed, the trap, after the live steam valve is closed, continuing its lifting movement sufficiently to open the vent valve. The spring 27 and the loose mounting of the valve head 26 upon the valve stem 25 permit the retention of said vent valve upon its seat 29 during a portion of the upward movement of the bowl 6 and until the live steam valve is closed, the spring 27 being contracted by the upward movement of the bowl 6 and consequent similar movement of the valve stem 25, which being upon the same side of the rocking axis as the bowl moves in the same direction as the bowl. After the live steam valve is entirely closed, the head 26 of the vent valve is snapped from the valve seat 29, and thus permits the escape of steam from within the bowl 6. During the reverse movement of the bowl,— that is to say, when it is filled and is descending in the frame,—the vent valve closes, and in this embodiment of the invention simultaneously with the opening of the live steam valve. This closing of the vent valve at a period not later than the opening of the live steam valve prevents loss of live steam through the exhaust. It will be apparent that neither spring nor packing is employed with the live steam valve 19 and that it operates without friction and is seated through its own weight.

The tilting of the bowl 6 is preferably governed by means of a weighted lever 30' connected by a link 31 with an ear 32 on the bowl 6. In the particular form of weighted lever and link shown, the operation of the trap is rendered desirably prompt and accurately responsive to predetermined conditions of water in the bowl 6, substantially in the manner described in my Patent No. 893,529, July 14, 1908. It is apparent, however, that within the scope of my invention any other suitable means covering the tilting of the bowl may be utilized.

Having thus described one illustrative embodiment of my invention, I desire it to be understood that although specific terms are employed, they are used in a generic and descriptive sense and not for purposes of limitation, the scope of the invention being set forth in the following claims.

1. A steam trap provided with a tilting receptacle, a trunnion or trunnions whereon the trap is mounted for tilting movement and having live steam and vent passages therethrough, and a live steam valve and a vent valve structurally distinct from and non-connected with each other and in communication respectively with the said passages through said trunnion or trunnions, one at least of said valves being within the receptacle.

2. A steam trap provided with a tilting receptacle, a trunnion or trunnions whereon said trap is mounted for tilting movement and having live steam and vent passages therethrough, a live steam valve and a vent valve within said receptacle and structurally distinct from and non-connected with each other, said valves being in communication respectively with said passages through said trunnion or trunnions.

3. A steam trap comprising a tilting receptacle having means to admit water of condensation thereto and a steam inlet separate from said means for admitting water of condensation, and a valve to equalize the pressure upon the water of condensation admitted to said receptacle, said valve being positioned within said receptacle at one side of its tilting axis and operated by the movement of said receptacle.

4. A steam trap comprising in combination a tilting bowl having a tilting axis and a head, said head being upon the opposite side of the tilting axis from the body of the bowl, a passage for admitting steam to the bowl, and a steam admission valve positioned within said head.

5. A steam trap comprising in combination a tilting receptacle, a passage for admitting steam thereto, and steam admission and vent valves positioned within said receptacle and located upon opposite sides of a plane passing through the tilting axis of the receptacle.

6. A steam trap comprising in combination a tilting bowl, a passage for admitting steam, oppositely acting and structurally disassociated pressure admission and vent valves located upon opposite sides of a plane passing through the tilting axis of said bowl and operated by the tilting thereof and a passage independent of said steam admission passage for placing said pressure admission valve in communication with the tilting bowl.

7. A steam trap comprising in combination a tilting receptacle having a live steam inlet passage and also having mounted in said receptacle at one side of the tilting axis a live steam valve controlling said live steam inlet passage and movable in the direction of its own axis.

8. A steam trap comprising a tilting receptacle having a live steam inlet passage and also having a live steam valve positioned in said receptacle and controlling said passage, and means for lifting said valve from its seat upon tilting movement of said receptacle.

9. A steam trap comprising a tilting receptacle, having a live steam inlet passage, a trunnion for said receptacle having an offset member and a live steam valve controlling said live steam inlet passage and supported by said offset member within said receptacle.

10. A steam trap comprising in combination a tilting receptacle having a live steam inlet passage and also having a trunnion and a live steam valve controlling said live steam inlet passage and positioned in said receptacle and movable in the direction of its own axis and operated by engagement of said receptacle therewith.

11. A steam trap comprising a tilting chamber having a live steam admission and vent trunnion communicating with said tilting chamber, a live steam valve supported by said trunnion within the trap and controlling the live steam passage in said trunnion and an independent vent valve controlling the vent passage in said trunnion.

12. A steam trap comprising a tilting chamber having a live steam admission and vent trunnion, a live steam valve supported by said trunnion within the trap and controlling the live steam passage in said trunnion, and an independent vent valve supported by said trap interiorly thereof and controlling the vent passage in said trunnion.

13. A steam trap comprising a tilting chamber having a partitioned, fluid admission and exhaust trunnion communicating with said tilting chamber and having a lateral projection within the trap and a fluid pressure admission valve seated within said projection and having a stem adapted to be engaged by said trap and lifted from its seat.

14. A steam trap comprising a tilting chamber having a partitioned, fluid admission and exhaust trunnion communicating with said tilting chamber and having a lateral projection within the trap and a fluid pressure admission valve seated within said projection and having a stem adapted to be engaged by said trap and lifted from its seat, and an independent vent valve supported by and operated by movement of said trap.

15. A steam trap comprising in combination a tilting receptacle having a fluid pressure inlet passage, a pressure admission valve controlling said passage and positioned in said receptacle and non-contacting therewith in a position of rest of said receptacle, and means within the receptacle for opening said valve subsequent to the commencement of a tilting movement of said receptacle.

16. A trap comprising a tilting receptacle having a pressure admission valve supported within the same and lost motion means for opening said valve by movement of said receptacle.

17. A steam trap comprising a tilting receptacle having a fluid pressure inlet passage, said receptacle having a pressure admission valve supported within the same, lost motion means for opening said valve by movement of said receptacle and an independent vent valve.

18. A steam trap comprising a tilting receptacle having a fluid pressure inlet passage, said receptacle having a pressure admission valve supported within the same, and non-contacting therewith in a position of rest of said receptacle.

19. A steam trap comprising a tilting receptacle having means to admit water of condensation thereto, and a steam inlet and a valve to equalize the pressure upon the water of condensation admitted to said receptacle, said valve being positioned within said receptacle at one side of its tilting axis and operated upon movement of said receptacle and a relief valve also within said receptacle.

20. A steam trap comprising in combination a tilting bowl having a live steam inlet passage and structurally disassociated live steam and vent valves positioned within said bowl and operated by the tilting thereof.

21. A steam trap comprising in combination a tilting bowl having a live steam inlet passage, a live steam valve controlling said passage and a vent valve operatively independent of said live steam valve, both of said valves communicating with said bowl through the bottom thereof, and at least one of said valves being within the bowl.

22. A steam trap comprising a tilting receptacle having a pressure admission passage, a fixed member contained within said tilting receptacle, and a pressure admission valve carried by said fixed member and operated by the movement of said receptacle, and controlling said pressure admission passage.

23. A steam trap comprising a tilting receptacle having a steam admission passage, a fixed member contained within said receptacle and live steam and vent valves operated by the tilting of said receptacle, said live steam valve controlling said passage, and one at least of said valves being carried by said fixed member.

24. A steam trap comprising in combination a tilting receptacle having a trunnion and a steam inlet passage communicating with the receptacle through the trunnion, a steam admission valve controlling said passage, and a vent valve structurally disassociated from said steam admission valve and communicating with the receptacle through the trunnion, one at least of said valves being within the receptacle.

25. A steam trap comprising in combination a tilting receptacle having a pressure inlet passage, a valve positioned in said receptacle and controlling said passage and movable in the direction of its own axis and means wholly within said receptacle for operating said valve.

26. A steam trap comprising in combination a tilting receptacle having a pressure inlet passage, a valve positioned in said receptacle and controlling said passage and movable in the direction of its own axis, said valve being moved by contact of the inner face of the receptacle therewith.

27. A steam trap comprising in combination a tilting receptacle having a fixed member therein, said receptacle having a pressure admission passage and a valve within said tilting receptacle controlling said passage, carried by said fixed member and movable in the direction of its own axis.

28. A steam trap comprising a tilting receptacle having a live steam inlet passage, a trunnion for said receptacle having an offset member and a live steam valve supported by said offset member and within said receptacle and operated by contact of said receptacle therewith to control said passage.

29. A steam trap comprising in combination a tilting receptacle having a pressure admission passage, a pressure admission valve positioned in said receptacle to control said passage, and non-contacting with said receptacle in a position of rest of the latter, said valve being opened subsequent to the commencement of a tilting movement of said receptacle by contact of said receptacle therewith.

30. A steam trap comprising in combination a tilting bowl, a passage for admitting steam to the bowl and oppositely acting and structurally disassociated pressure admission and vent valves located upon opposite sides of a plane passing through the tilting axis of the bowl longitudinally of said axis and operated by the tilting thereof, both of said valves communicating with the interior of the bowl through the bottom thereof.

31. A steam trap provided with a tilting receptacle and a passage for admitting water of condensation thereto, a trunnion or trunnions whereon the trap is mounted for tilting movement and having live steam and vent passages therethrough and distinct from said passage for admitting water of condensation, a live steam valve and a vent valve structurally distinct from and non-connected with each other and in communication respectively with said passages through said trunnion or trunnions one at least of said valves being directly carried by said receptacle.

32. A steam trap comprising in combination a tilting bowl having a live steam inlet passage, a live steam valve controlling said passage and a vent valve for the bowl structurally and operatively disassociated from said live steam valve, at least one of said valves being positioned within said bowl and said valves being operated by the tilting of the bowl.

33. A steam trap comprising in combination a tilting bowl having a live steam inlet passage, a live steam valve controlling said passage, and a vent valve operatively independent of said live steam valve, both of said valves communicating with said bowl through the bottom thereof and at least one of said valves being directly carried by said bowl.

In testimony whereof, I have signed my name to this specification, in the presence of two subscribing witnesses.

FRANK A. LITTLEFIELD.

Witnesses:
   IRVING U. TOWNSEND,
   MAY H. LOWRY.

---

Copies of this patent may be obtained for five cents each, by addressing the "Commissioner of Patents, Washington, D. C."